(12) United States Patent
Yoshimura et al.

(10) Patent No.: US 7,080,084 B2
(45) Date of Patent: Jul. 18, 2006

(54) METHOD FOR CHANGING DATABASE CONSTRUCTION INFORMATION

(75) Inventors: Mitsuhiko Yoshimura, Tokyo (JP); Norifumi Nishikawa, Machida (JP); Hitoshi Ashida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 10/353,954

(22) Filed: Jan. 30, 2003

(65) Prior Publication Data

US 2004/0044671 A1  Mar. 4, 2004

(30) Foreign Application Priority Data

Aug. 30, 2002  (JP) .............................. 2002-252342

(51) Int. Cl.
  *G06F 7/00*  (2006.01)
  *G06F 17/30*  (2006.01)

(52) U.S. Cl. .......................................... 707/100; 707/4

(58) Field of Classification Search ................ 707/100, 707/4
  See application file for complete search history.

(56) References Cited

U.S. PATENT DOCUMENTS 6,061,515 A * 5/2000 Chang et al. ............... 717/114
6,366,917 B1 * 4/2002 St. John Herbert, III ... 707/100
6,591,272 B1 * 7/2003 Williams .................... 707/102
6,963,880 B1 * 11/2005 Pingte et al. ............ 707/103 R
6,999,956 B1 * 2/2006 Mullins ........................ 707/2
2005/0228803 A1 * 10/2005 Farmer et al. .............. 707/100

OTHER PUBLICATIONS

"RedBrick Warehouse", Infocom Company, pp. 6 and 7.
William A. Giovinazzo, "Object-Oriented Data Warehouse Design Building a Star Schema", pp. 1-2, pp. 127-152, PRehTICE HALL, 2000.
Robert J. Hocutt, "The official guide to Informix/Red Brick Data Warehousing", chapter 1, Hungry Minds, Inc.,2000.

* cited by examiner

*Primary Examiner*—Don Wong
*Assistant Examiner*—Thanh-Ha Dang
(74) *Attorney, Agent, or Firm*—Mattingly, Stanger, Malur & Brundidge, P.C.

(57) ABSTRACT

Upon modifying a database system, a modification range is managed on the basis of a pattern name, a variable name associated therewith, an influence range detection start destination based on the variable name, and an influence range detection result as modification pattern information. And a variable value is registered according to a pattern selected based on the modification pattern information, a modification object on a plurality of middleware bases is detected as influence range information on the basis of the variable value entered in association with a modification pattern, and a schema definition of a database and a group of commands for data transformation are modified in accordance with the modification contents using the influence range information.

9 Claims, 9 Drawing Sheets

FIG. 4
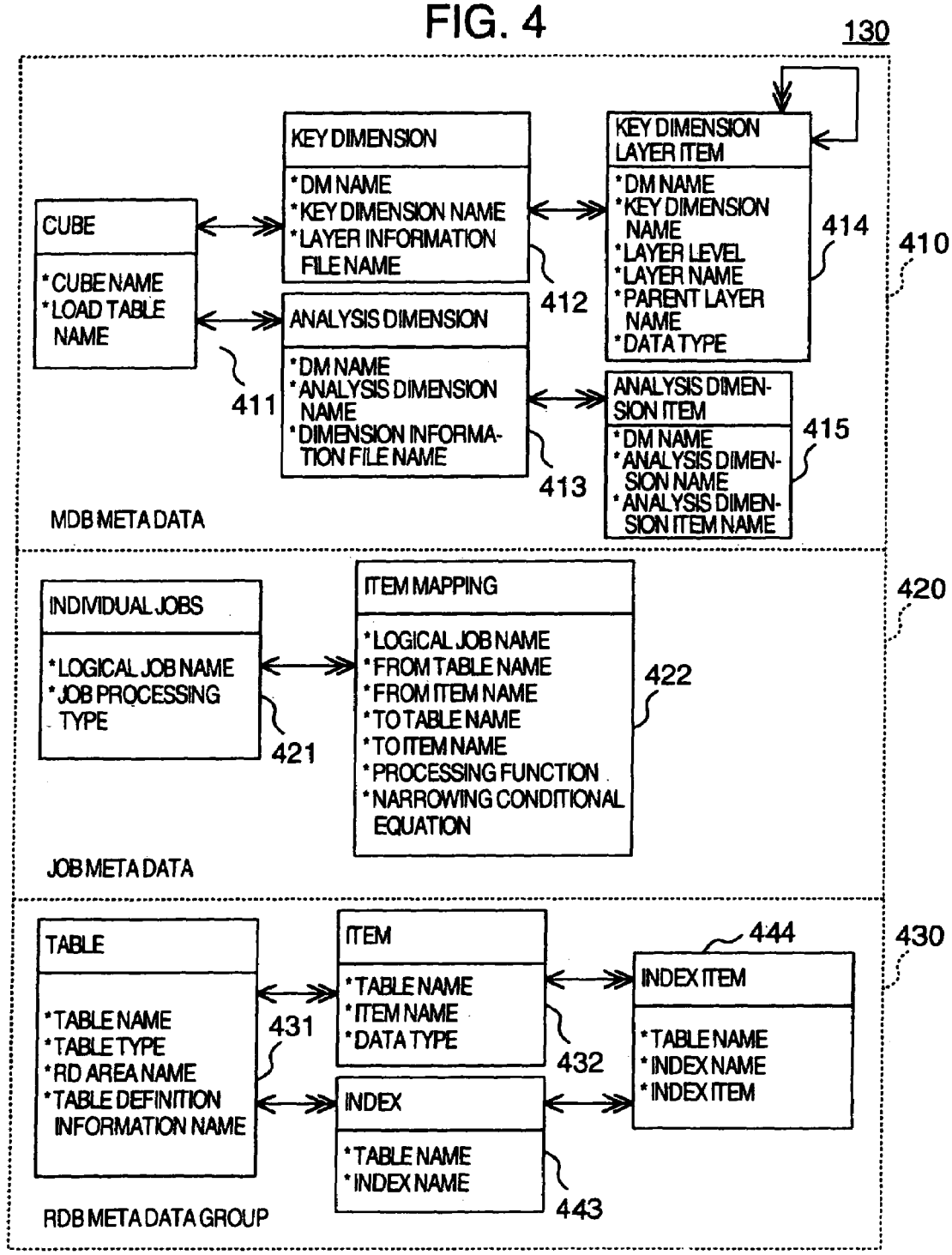
REMARK
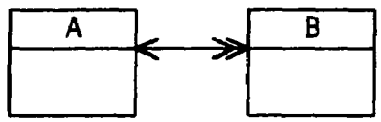
INDICATES THAT A PLURALITY OF RECORDS OF B TABLE CORRESPOND TO ONE RECORD OF A TABLE FIG. 5
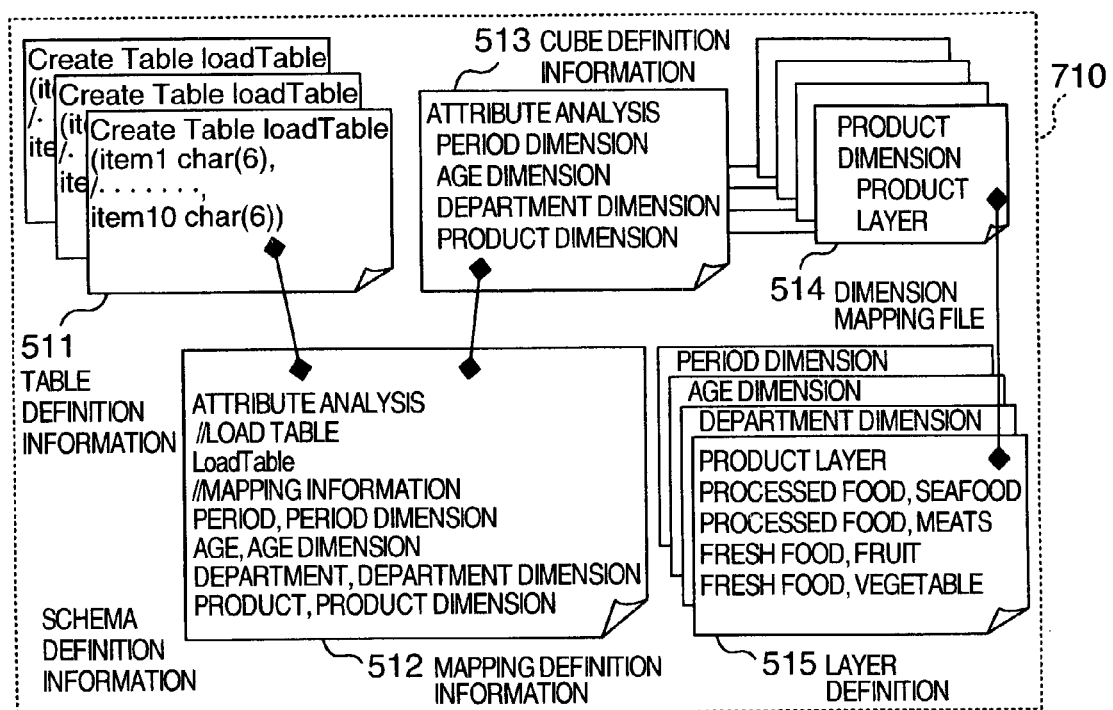
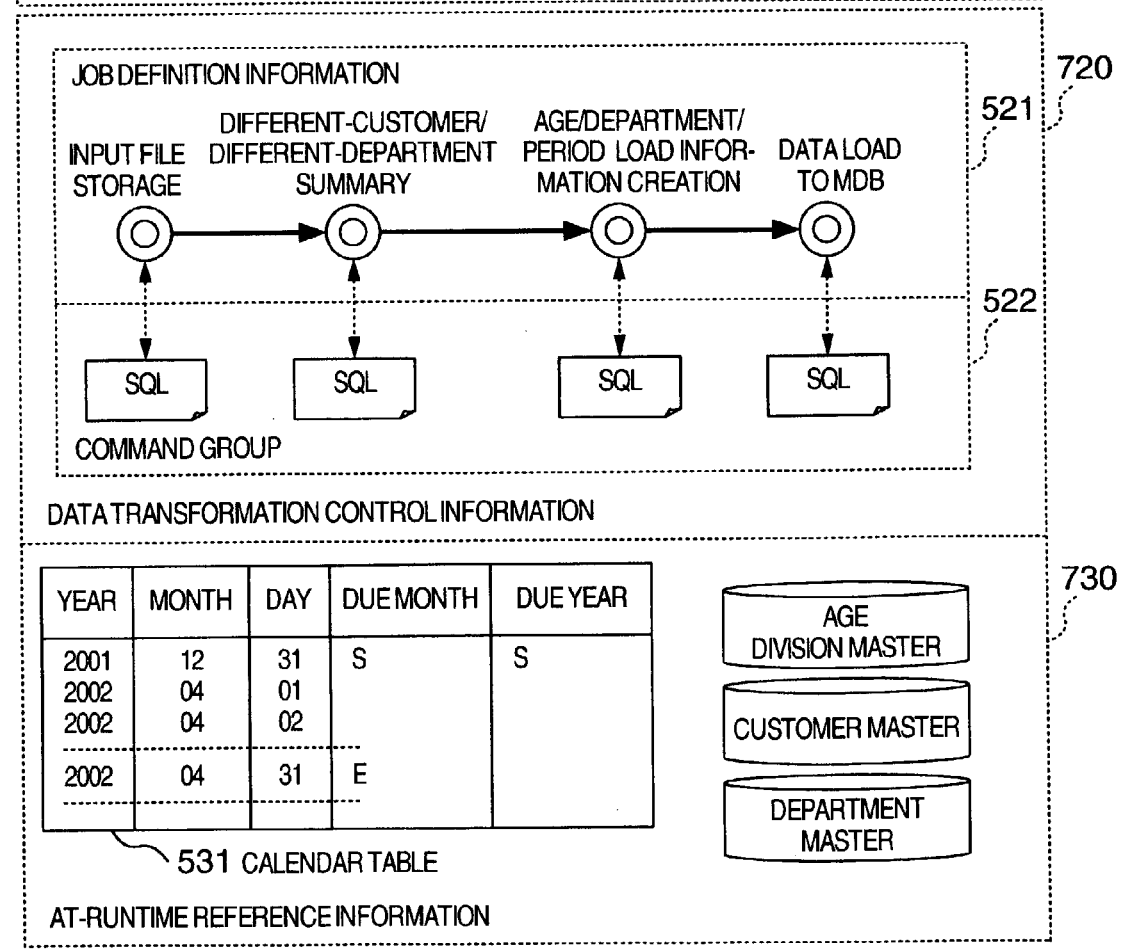

FIG. 9

```
┌─────────────────────────────────────────────────────────────┐
│           CUSTOMIZE PATTERN SELECTION SCREEN                │
├─────────────────────────────────────────────────────────────┤
│                                                             │
│  PATTERN NAME LIST    911      PROPERTY    912       913    │
│                                NAME                         │
│  ┌──────────────────────────┐  ┌──────────────┬──────────┐  │
│  │ PATTERN NAME             │  │ PROPERTY NAME│ VALUE    │  │
│  ├──────────────────────────┤  ├──────────────┼──────────┤  │
│  │ CUBE DIMENSION MODIFICATION│ │ CUBE NAME    │ AGE··    │  │
│  │ TRANSACTION DUE DATE MODIFICATION│ADDITION DIMENSION│PRODUCT AXIS│
│  │                          │  │              │          │  │
│  └──────────────────────────┘  └──────────────┴──────────┘  │
│                                                             │
│                             ┌────────┐   ┌──────────┐       │
│                             │ CANCEL │   │ REGISTER │       │
│                             └────────┘   └──────────┘       │
└─────────────────────────────────────────────────────────────┘
                                                    910
```

METHOD FOR CHANGING DATABASE CONSTRUCTION INFORMATION

BACKGROUND OF THE INVENTION

The present invention relates to a system support technique for facilitating change of a database system to be implemented using a plurality of middleware bases such as data warehouses (DWH). More particularly, the present invention is directed to modifying a modification location in a plurality of middleware bases and to a modifying the specified location. The present invention also relates to a system modification support of operations of forming such database information as not only data warehouse but also a web system to be disclosed on the Web.

In these years, in a wide range of various types of shops or stores such as department stores, specialty stores, mass merchandisers hawking their electronic wares or domestic appliances, and super markets, the attribute data (such as name and address) of a customer who bought articles and his or her purchase history can be acquired using his or her unique payment card which can be used between shops or stores or between store or shop groups. In such circumstances, there has been formed a system which processes purchase histories acquired in individual shops or stores according to analysis techniques having various purposes. In such background, there is a system called a data warehouse which collects detail information about purchase histories or the like from various viewpoints and performs detail searching operation.

A data warehouse is regarded as belonging to one of database system fields. Since the data warehouse outputs data results associated with various viewpoints, the data warehouse is implemented, in many cases, with use of many middleware bases including relational database (RDB) and multidimensional database (MDB), an extraction, transformation and loading (ETL) tool, and a schedule management tool of data processing job.

The multidimensional database is a database which is different from a related relational database and has three or more dimensions. In the relational database, data structure for data storage is called a table; while, in the multidimensional database, a data structure for data storage is called a cube. For example, as an example of the cube, an age/department/period cube 209 having an age dimension, a department dimension and a period dimension is shown in FIG. 2. The multidimensional database can operate to display slicing data, raise or lower the dimensional layer which is an object to be analyzed.

The multidimensional database is described in William A. Giovinazzo, "Object-Oriented Data Warehouse Design Building a Star Schema", pp. 1–2, pp. 127–152, PRehTICE HALL, 2000.

In this connection, a tendency is to strongly demand of shortening the period of forming an information system such as the above data warehouse. With respect to the data warehouse, for the purpose of shortening the period of forming a system in response to customer's demand, there are known techniques which follow.

As a first related art, "StartNow for Relationship Marketing" (which is a registered trademark of IBM Corporation) of IBM Corporation as packages grouped by different business types or businesses integrally offers hardware, software, analysis model and introduction/support services grouped by business types, which are specialized in customer relationship management (CRM).

As a second related art, "RedBrick Warehouse" of Infocom company as a tool for supporting formation or construction of a data warehouse is a database exclusive to the construction of the data warehouse. Further, a tool called "Red Brick Warehouse Administrator" for supporting the design and construction of a data warehouse offers a graphic user interface (GUI) for defining a relationship between RDB tables forming the data warehouse and a graphic user interface (GUI) for calculating an approximate value of a necessary disk capacity. The "RedBrick" is described in Robert J. Hocutt, "The official guide to Informix/Red Brick Data Warehousing", chapter 1, Hurgry Minds, Inc., 2000 ("RedBrick Warehouse" being a registered trademark of Infocom company).

Oracle Corporation also supplies "Oracle Warehouse Builder (OWB)" for designing, mounting and managing a data warehouse. Using the OWB, the RDB table, MD schema and ETL job can be designed through GUI. ("Oracle Warehouse Builder (OWB)" is a registered trademark of Oracle Corporation).

The first related art is directed to shortening the introduction period using the package as a target. However, since the data warehouse and analysis system are systems for supporting strategy-making or decision-making based on features of its own firm or business model, the system is required to be altered or modified by an introduction destination user according to the circumstances of the introduction destination. However, the internal structure of the package is implemented on a plurality of middleware bases, it is difficult to identify a modification location or to perform modifying operation the location according to the above alternation. The modification location is also limited to within a range assumed as the package. For this reason, when a demand of such alternation takes place, it sometimes becomes impossible to shorten the construction period even when such a package as described in the related art 1 is used. Further, when it is tried to cope with various types of customer requests using such a related art, it is required to manage many parts to cope with the alternation of pre-estimated modifications, which leads to the fact that the number of parts managed by the system is increased and system management becomes complicated.

In particular, the formation or construction of the data warehouse is implemented with use of many middleware bases including RDB, MDB, and a job management system for managing data processing jobs on the RDB or MDB. As a result, even when the alternation is small in external specifications, it is required to alter the operation on the plurality of middleware bases. For this reason, (1) since the modification location is dispersed on a plurality of middleware bases, the number of steps necessary for detecting the modification location is increased, (2) since the detected modification location is modified in the developing environment of the plurality of middlewares, the number of steps necessary for maintaining the consistency or compatibility or for confirming operations becomes large, and (3) since the developer is required to have a high level of knowledge, the modifying operation cannot be carried out without such an operator having such a high level of knowledge.

The second related art is directed to supporting the design or mounting of a data warehouse with use of a construction support tool. The modification works itself involved by the alteration can be made easy by means of such a tool, but the problems mentioned in items (1), (2) and (3) cannot be solved. In order for the developer to modify the individual alterations to maintain the entire compatibility, it is necessary for the developer to proceed with the modifying works while understanding the entire influence relation.

SUMMARY OF THE INVENTION

It is therefore an object of the present invention to provide a database construction modifying method which can alter a data warehouse system with the internal structure of an analysis system transparent to a user according to a pre-registered alteration pattern.

In the present invention, a modification range is managed on the basis of a pattern name indicative of the contents of an alteration, a variable name associated therewith, an influence range detection start destination based on the variable name, and an influence range detection result as alteration pattern information. And a pattern is selected based on the alteration pattern information, a variable value corresponding to the pattern is registered, an alteration object on a plurality of middleware bases is detected as influence range information on the basis of the entered variable value associated with the alteration pattern, and database schema definition and a group of commands for data transformation are modified according to the contents of the alteration with use of the influence range information. Through the above operations, the system can be altered by the developer who merely selects an alteration pattern and enters a variable value associated therewith. The developer can alter the process of the database system such as data warehouse, while the developer can eliminate the need for knowing internal information and internal system structure on, e.g., whether to detect the influence range of internal process as a search condition of which internal part or to apply an alteration to which resource.

Further, the present invention has operations of detecting the influence range of an alteration location to which cooperation between a plurality of middlewares was taken into consideration and of modifying and altering the system according to the influence range. As a result, the need for individually detecting and modifying an alteration location in each of environments of the plurality of middlewares can be eliminated.

Other objects, features and advantages of the invention will become apparent from the following description of the embodiments of the invention taken in conjunction with the accompanying drawings.

BRIEF DESCRIPTION OF THE DRAWINGS

FIG. 4 is an example of DWH meta information;

FIG. 5 is an example of DWH construction information;

FIG. 9 shows a display screen for alteration pattern selection.

DESCRIPTION OF THE EMBODIMENT

An embodiment of the present invention will be explained with reference to attached drawings.

Figure 2:
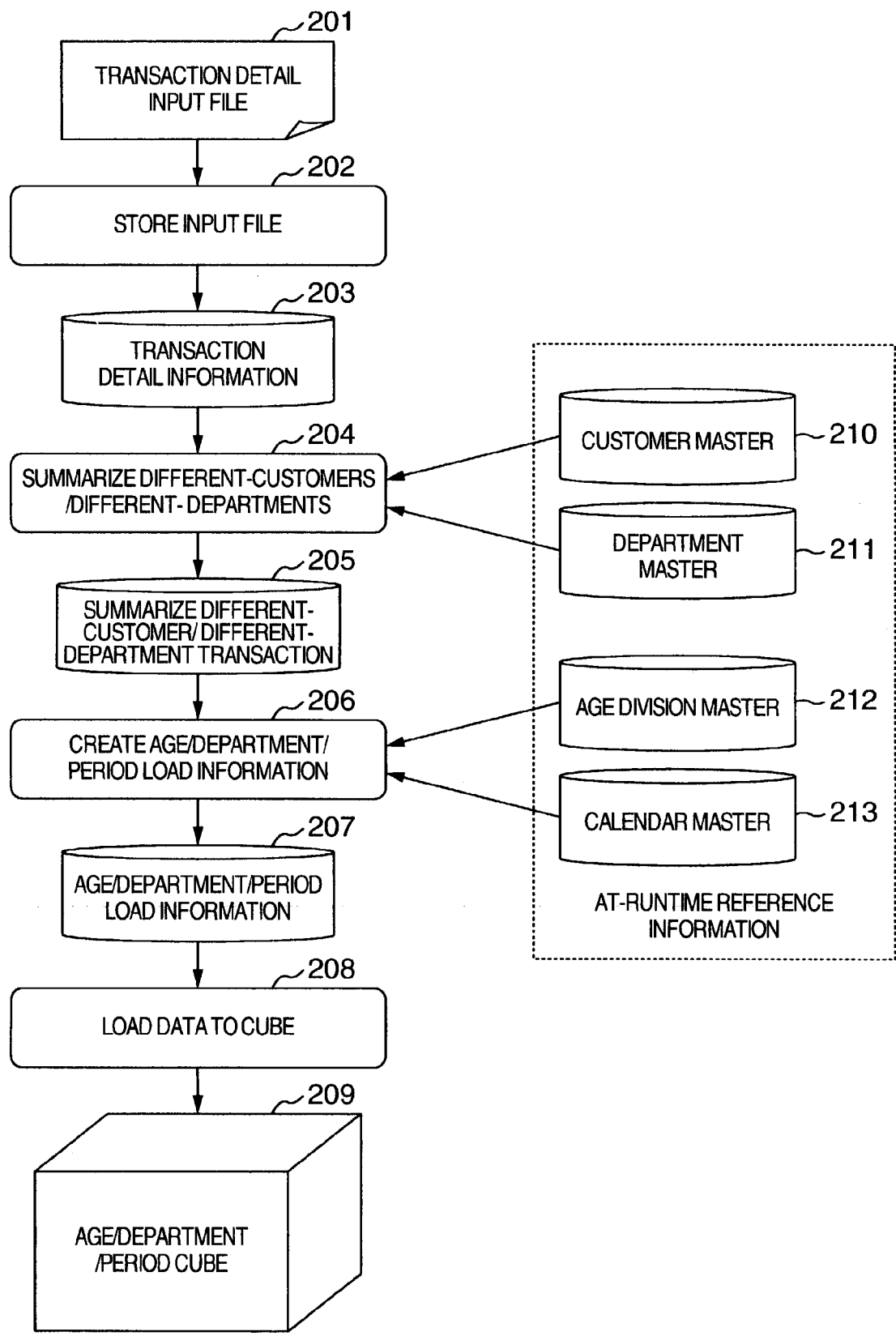
FIG. 2 shows an example of forming a data mart in the present invention.

Explanation will be first made as to the summary of a data warehouse system by referring to FIG. 2. In the data warehouse system, data transformation is carried out in a multiplicity of stages as shown in FIG. 2, so that a so-called cube is eventually formed on a multidimensional database (which will be also represented by MDB in the drawings). In this example, a transaction detail input file 201 is entered as an input and processed at an input file storage step 202 so that the system outputs transaction detail information 203. The file data is sequentially processed at a customer/department summary step 204, at a step 206 of creating age/department/period load information, and at a step 208 of loading data into the cube to obtain a halfway result, and then the halfway result is stored in the intermediate tables 203, 205 and 207.

In this connection, at the time of creating the intermediate tables, the system may sometimes refer to masks called at-runtime reference information. At the step 206 of creating age/department/period load information in FIG. 2, for example, for the purpose of knowing a transaction each-month start/end date, the system refers to such a calendar table 531 as shown in FIG. 5 as a calendar master 213. In the calendar table 531, flags indicative of transaction each-month start/end dates are placed in an item "each month" of the calendar table 531 for management. In the example of FIG. 5 to be explained later, it is assumed that the each-month transaction starts on 1st and ends on 31st. By referring to this item during operation of the age/department/period load information creation step 206, the system acquires the transaction each-month start/end dates. That is, by modifying the value of the calendar table 531 as the at-runtime reference information, the system can modify the transaction each-month start/end dates to be treated in the age/department/period load information creation step 206.

The data of the data warehouse shown in FIG. 2 include an input file for external data input, a cube obtained as the final result of data construction, a table for holding an intermediate result of data processing, a job for data transformation between the tables, cubes and input files, and at-runtime reference information on the calendar master or the like to be referred to and used during data processing operation in the data transformation mode.

A cube is formed as a result of such multistage data transformation operation, so that, when an item is added to the age/department/period cube, the addition will exert an influence upon all elements shown in FIG. 2.

Upon modifying such a data warehouse as shown in FIG. 2, it is necessary for the system first to detect the influenced destination and then to modify the resource detected as the influenced destination. However, the related art requires a large number of steps for these works. In accordance with the present invention, the works of detecting the influenced destination and the modifying operation based on the detected result can be facilitated.

The arrangement of one embodiment of the present invention will first be explained with reference to FIG. 1. The system of the embodiment includes a modification section 110, a modification pattern information section 120, a meta information section 130 of data warehouse (DWH) schema, an influence range information section 140, and a DWH construction information section 150. The modification section 110 has a modification pattern designation portion 111, a modification range detection portion 112, and a DWH construction information modification portion 113.

In the modification pattern designation 111, the system reads the modification pattern information 120 and displays a list of the modification pattern in a pattern name list display region 911 on a modification pattern select display screen as shown in FIG. 9. When the user selects desired necessary pattern names from the pattern name list display region 911, the system searches the modification pattern information 120 with use of the selected pattern name as a key and displays variable names which have complied with the conditions in a variable name display region 912 in FIG. 9. And the user enters the corresponding values of the displayed variable names in a value input region 913. Then the user operates a registration function button on a modification pattern selection screen 910 in FIG. 9.

In response to the above operation, in the modification range detection 112, the system detects an influence range for each of the cube, table, input file, job and at-runtime reference information with use of the values entered based on the selected pattern and pattern variable names. And the system stores detected results of the influence ranges in an influence range information 140. Stored in the influence range information 140 are information indicative of what type of modification is necessary for the cube, table, input file, job and at-runtime reference information according to the designated modification pattern.

In the DWH construction information modification 113, the system modifies the meta information 130 of data warehouse (DWH) schema on the basis of the influence range information 140 to generate DWH construction information 150 with use of the modified meta information 130 of data warehouse (DWH) schema. The DWH construction information 150 includes commands and execution files which are operated on such a middleware base as a job management tool, a multidimensional database or a relational database. Through the above operations, the DWH construction information 150 which reflects the modified contents of the designated pattern is generated. As a result, there can be formed a DWH system which reflects the required modification contents.

Figure 3:
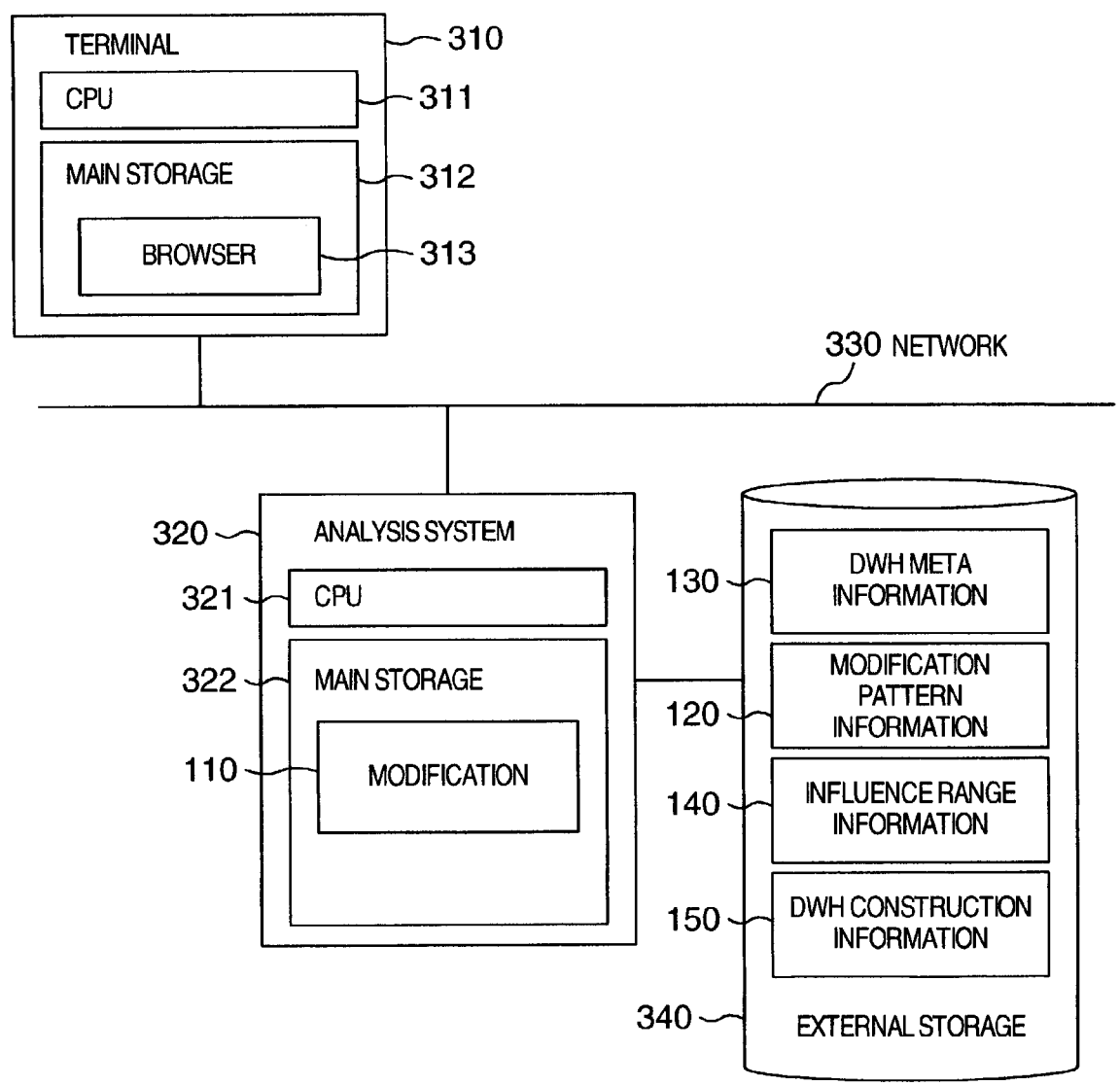
FIG. 3 is an arrangement of a hardware system.

FIG. 3 shows an arrangement of a system in accordance with an embodiment for carrying out the present invention. The system includes a terminal 310, an analysis processing system 320, a network 330, and an external storage 340. The terminal 310, analysis processing system 320 and external storage 340 have CPUs 311 and 321 and main storages 312 and 322 respectively, and the modification section 110 is executed in the main storage 322 of the analysis processing system 320. Stored in the external storage 340 are the meta information 130 of data warehouse (DWH) schema, the modification pattern information 120, the influence range information 140, and the DWH construction information 150. FIG. 3 shows an exemplary arrangement for realizing the present invention and thus another arrangement may be possible.

Prior to the explanation of the detailed embodiments of the present invention, explanation will be made as to the respective contents of the modification pattern information 120, the meta information 130 of data warehouse (DWH) schema, influence range information 140 and DWH construction information 150 shown in FIG. 1.

Figure 1:
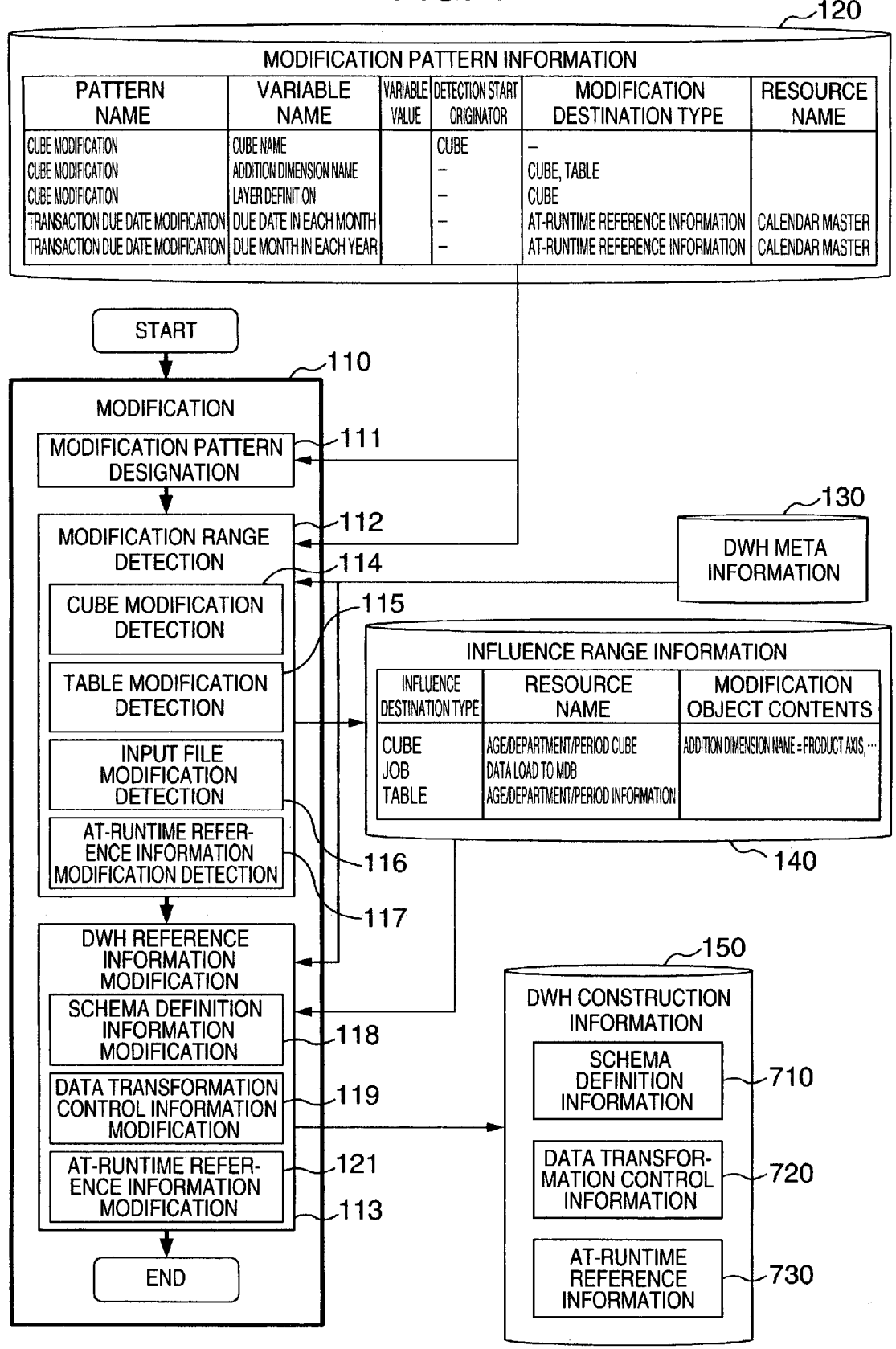
FIG. 1 shows a configuration and operation of the present invention.

The modification pattern information 120, as shown in FIG. 1, includes items of pattern name, variable name, variable value, detection start originator, influence destination type and resource name. Stored in the pattern name is a title corresponding to its pattern. Stored in the variable name is a variable name to be entered to perform modification corresponding to the pattern. A value entered according to the variable name is stored in an item "value". Stored in the detection start originator is the value of any of "cube", "input file" and "at-runtime reference information". These values indicate a category in which external modification request is generated to the data warehouse. Stored in the influence destination type is the value of any of "cube", "job", "table", "input file", and "at-runtime reference information". When specific resource name for the influence destination type can be previously registered as a pattern, the specific resource name (such as cube name, job name or table name) is previously stored in item "resource name".

The meta information 130 of data warehouse (DWH) schema includes information for management of resources in the systems. FIG. 4 shows details of the meta information 130 of data warehouse (DWH) schema. FIG. 4 shows table structures and relationships between tables expressed by a representation called an E-R (Entity-Relationship) diagram. The meta information 130 of data warehouse (DWH) schema includes meta information 410 of multi database schema, meta information 420 of job program schema, and meta information group 430 of relational database schema.

The meta information 410 of multi database schema has a cube 411, a key dimension 412, an analysis dimension 413, a key dimension layer item 414, and an analysis dimension item 415. The key dimension 412 is a table for storage of layer information necessary in the layered MDB, so that, when the value of "layer name" of a record as a parent is stored in an item "parent layer" of the key dimension 412, a link relationship can be kept between records in an identical table.

The meta information 420 of job program schema has a job 421 and an item mapping 422. The job 421 has a job name and a job processing type as its items. Stored in the item of job processing type is any of "input file capture", "intertable transformation", and "load table capture". Stored in the item mapping 422 are correspondence relations between the items for data processing. Item "From" in an From table is associated with an item "To" in a To table.

The meta information group 430 of relational database schema has a table 431, an item 432, an index 443, and an index item 444. Stored in the item 432 are the item name and data type of each table. Stored in the index 443 is an index name to manage information on association of the index name with an item as an index object. An item as the association destination is stored in the item name of the index item 444 on the basis of the index item 444.

As shown in FIG. 1, the influence range information 140 has an influence destination type, a resource name, and a modification object contents.

Stored in the influence destination type is the value of any of the "cube", "job", "table", "input file", and "at-runtime reference information". When the value of "cube" is stored in the influence destination type, this means to modify the meta information 410 of multi database schema and schema definition information 710. When the value of "table" is stored in the influence destination type, this means to modify the meta information group 430 of relational database schema and the schema definition information 710. When the value of "job" is stored in the influence destination type, this means to modify the meta information 420 of job program schema and data transformation control information 720. When the value of "at-runtime reference information" is stored in the influence destination type, this means to modify the at-runtime reference information 730.

Stored in the item of the resource name are resource names to be modified such as cube name, table name and command name. And stored in the item of modification object contents is information indicative of the types of the modification to be applied to the objects (cube, table, job, etc.) designated by the resource names.

The DWH construction information 150 has setting and control information to control the operation of the middleware base to implement the DWH system. The DWH construction information 150 has the schema definition information 710, data transformation control information 720, and at-runtime reference information 730. The DWH construction information 150 will be detailed below by referring to FIG. 5.

The schema definition information 710 includes table definition information 511, mapping definition information 512, cube definition information 513, dimension mapping file 514, and layer definition 515.

The table definition information 511 has an SQL command for table definition or information equivalent thereto.

The cube definition information 513 is used to define the axial structure of a cube. The detailed layer structure of the axis is stored in the layer definition 515. And the layer definition 515 and the cube definition information 513 are linked to each other by the dimension mapping file 514. Stored in the mapping definition information 512 are inter-item mapping information necessary for reading the table on the RDB into the MDB. When the mapping information is used, control of reading the values stored in a two-dimensional table into the cube of the MDS as a multi-dimension is carried out.

The data transformation control information 720 has job definition information 521 and a group of commands 522. The job definition information 521 has information indicative of definition of the execution sequence of the group of commands 522. The command group 522 includes commands for SQL for implementing individual operations in the DWH system, for stored procedure, or the like. When the sequence of these commands is registered in the job definition information 521 and a job is initiated, such a series of forming operations as shown in FIG. 2 is carried out.

The at-runtime reference information 730 has information to be referred to at the time of job execution. The at-runtime reference information 730 also includes a calendar table 531 which has items of calendar date, transaction each month and each year.

Figure 6:
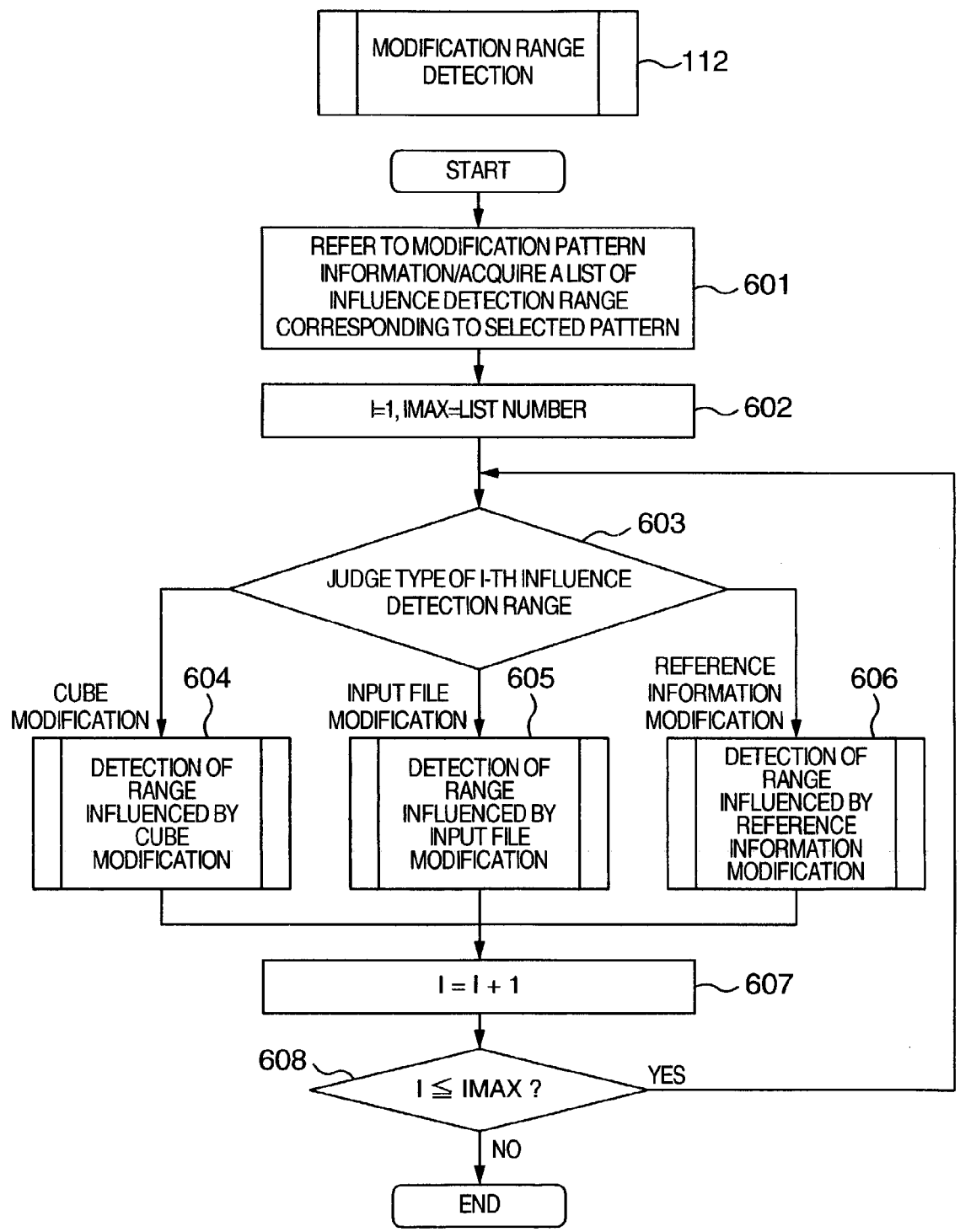
FIG. 6 is a flowchart of operations of detecting a customize range.
Figure 7:
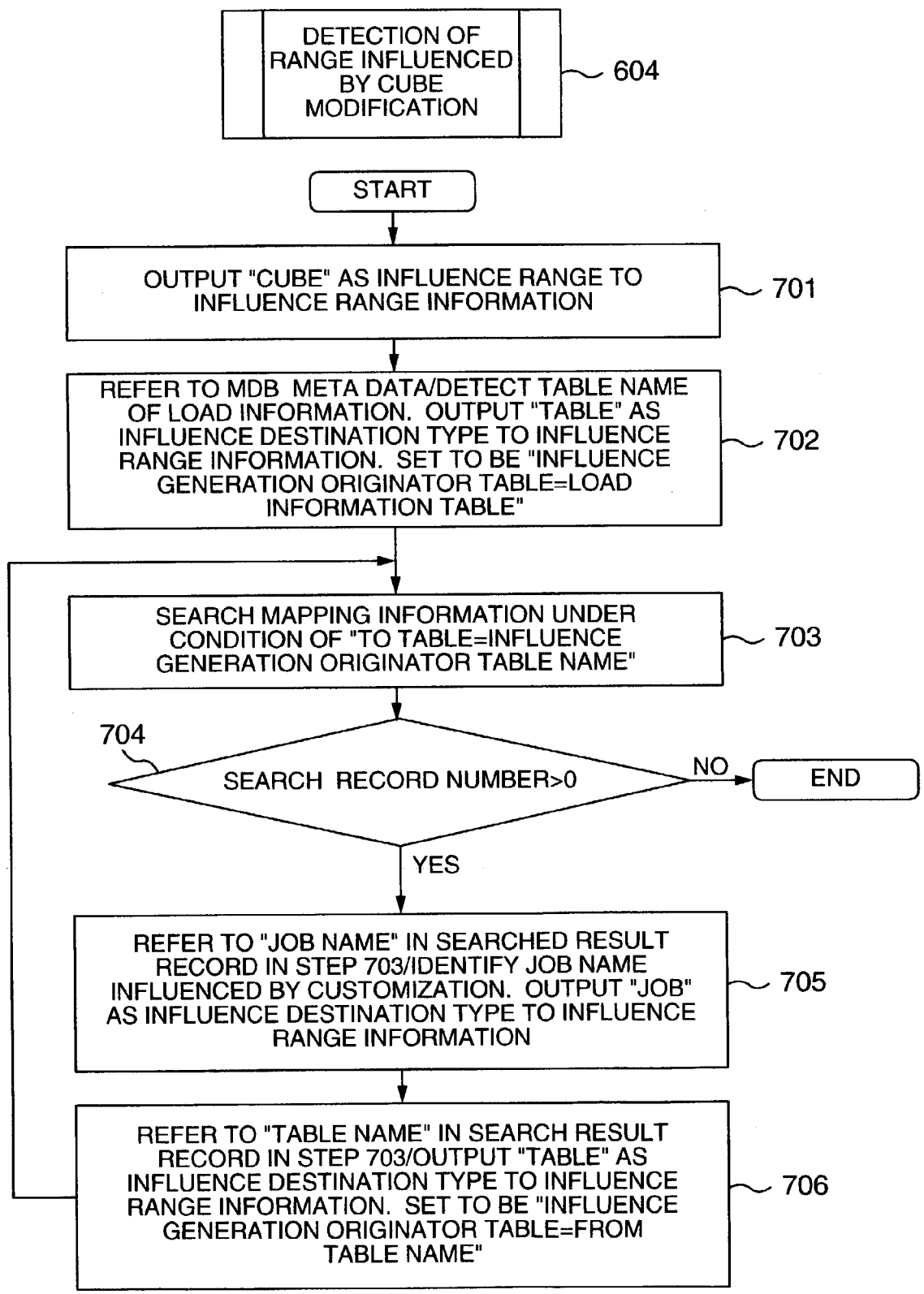
FIG. 7 is a flowchart of operations of detecting an influence range of a cube alteration.

Details of the modification range detection 112 in FIG. 1 will next be explained by referring to FIGS. 6, 7 and 8. First, FIG. 6 shows a flowchart showing how to detect a modification ranges detection 112.

At a step 601, the system refers to an item "detection start originator" of modification pattern information with use of the value of a cube name as a search condition. In general, the system obtains a plurality of "detection start originator" and holds its results as detection start originator array information.

At a step 602, the system initializes an array index relating to the array information held in the above step. Set I=1 and IMAX=a record count of the array information.

At a step 603, on the basis of the I-th value in the detection start originator array information, the system performs its branch judging operation. If the value of the detection start originator array information is "cube", then the system executes "influence range detecting step 604 for cube modification". If the value of the detection start originator array information is "input file", then the system executes "influence range detecting step 605 for input file modification". If the value of the detection start originator array information is "at-runtime reference information", then the system executes "influence range detecting step 606 for at-runtime reference information". The steps 604, 605 and 606 as branch destinations will be separately detailed later.

At a step 607, the array index is incremented by "1".

At a step 608, the system judges whether or not a relation of $I \leq IMAX$ is satisfied. When the relation is satisfied, the system executes the step 603; while, when the relation is not satisfied, the system terminates the operation of the modification range detecting step 112.

Next, explanation will be made as to the "influence range detecting step 604 for cube modification" with use of FIG. 7. The process carried out here corresponds to a process of backing going along arrows from the MDB side as shown in FIG. 2 and listing the related table name and data transformation name. When performing repetitive searching operation over the meta information 130 of data warehouse (DWH) schema shown in FIG. 4, the system can detect an influence range.

At a step 701, since a modification took place in the cube, the system outputs information indicative of an influence range to the influence range information 140 in FIG. 1. The system outputs a cube as a value to the item "influence destination type" of the influence range information 140. In the modification pattern designation 111, the system stores a cube name entered by the user in a resource name. Subsequently, the system further searches the modification pattern information narrowed down by the selected pattern name under a search condition that the item "influence destination type" includes the value of the cube. The system stores a correspondence relation between the variable name and value obtained as a result of the searching operation as modification object contents.

At a step 702, the system searches the cube 411 in FIG. 4 with use of the cube name as a searching condition and acquires the item "load table name" from the record of the searched result. As a result, the system can obtain a load table name corresponding to the MDB. And the system outputs information for identifying this load table as an influence range to the influence range information 140 in FIG. 1. The system outputs "table" as a value to the item "influence destination type" of the influence range information 140.

And the system the load table name in the item "resource name" of the influence range information 140. And the system acquires a variable name and a value associated therewith to be used for table modification from the modification pattern information 120. In order to acquire such variable name and value, the system searches the modification pattern information 120 with use of "pattern name=pattern name designated by modification pattern and influence destination type=table" as searching conditions. When referring to the variable name and value of the record information thus obtained, the system can obtain a variable name and value associated with the table modification. The system stores these variable names and values as the values of the modification object contents in the influence range information 140. And the system sets it to be "influence generation originator table=load information table".

At a step 703, the system searches the table of the item mapping 422 under a condition that "To table name=influence generation originator table". This searching operation corresponds to the operation of going back along arrows as shown in FIG. 2 and examining an input table name that used previous job to the current table tracing.

At a step 704, the system judges whether or not the record count as a searched result of the step 703 over the item mapping 422 is zero. When the record number as the searched result is not larger than zero, the system terminates the operation of the influence range detection 604 for cube modification. When the record number as the searched result is not smaller than 1, the system executes the operation of a step 705.

At the step 705, the system refers to "job name" in the record of the searched result obtained in the step 704, and outputs the influence range information 140 based on the job name shown therein. The value of "job" is stored in the "influence destination type" of the influence range information 140, and the value stored in "job name" in the record of the searched result obtained in the step 704 is stored in "resource name". Stored in the "modification object contents" of the influence range information 140 are a modification object item name for the input table side of the corresponding job and a modification object item name of an output table side to be influenced by the modification object item of the input table side. When a correspondence between the From item name and To item name is not present, the system adds a new correspondence between the From item name and To item name to the "modification object contents" of the influence range information 140.

At a step 706, the system refers to "To table name" in the record of the searched result obtained in the step 704 and identifies a table name to be influenced by the modification. The system outputs the influence range information 140 to indicate that the schema of the identified table was influenced. The value of the "table" is stored in the "influence destination type" of the influence range information 140, and the value stored in the "To table name" in the record of the searched result obtained in the step 704 is stored in "resource name". Addition or modification contents to the To item added or modified in the step 705 is stored in the "modification object contents" of the influence range information 140. And the system refers to the "From table name" in the record of the searched result obtained in the step 704, sets the influence generation originator table name and performs the operation of the step 703 with use of the value stored in the influence generation originator table name=From table name.

Through the aforementioned operations, the system can backwardly trace the arrows in the data processing operations shown in FIG. 2, and generate the influence range information 140 on the basis of the resource names (job name, table name and cube name) obtained by reversely tracing the arrows.

Figure 8:
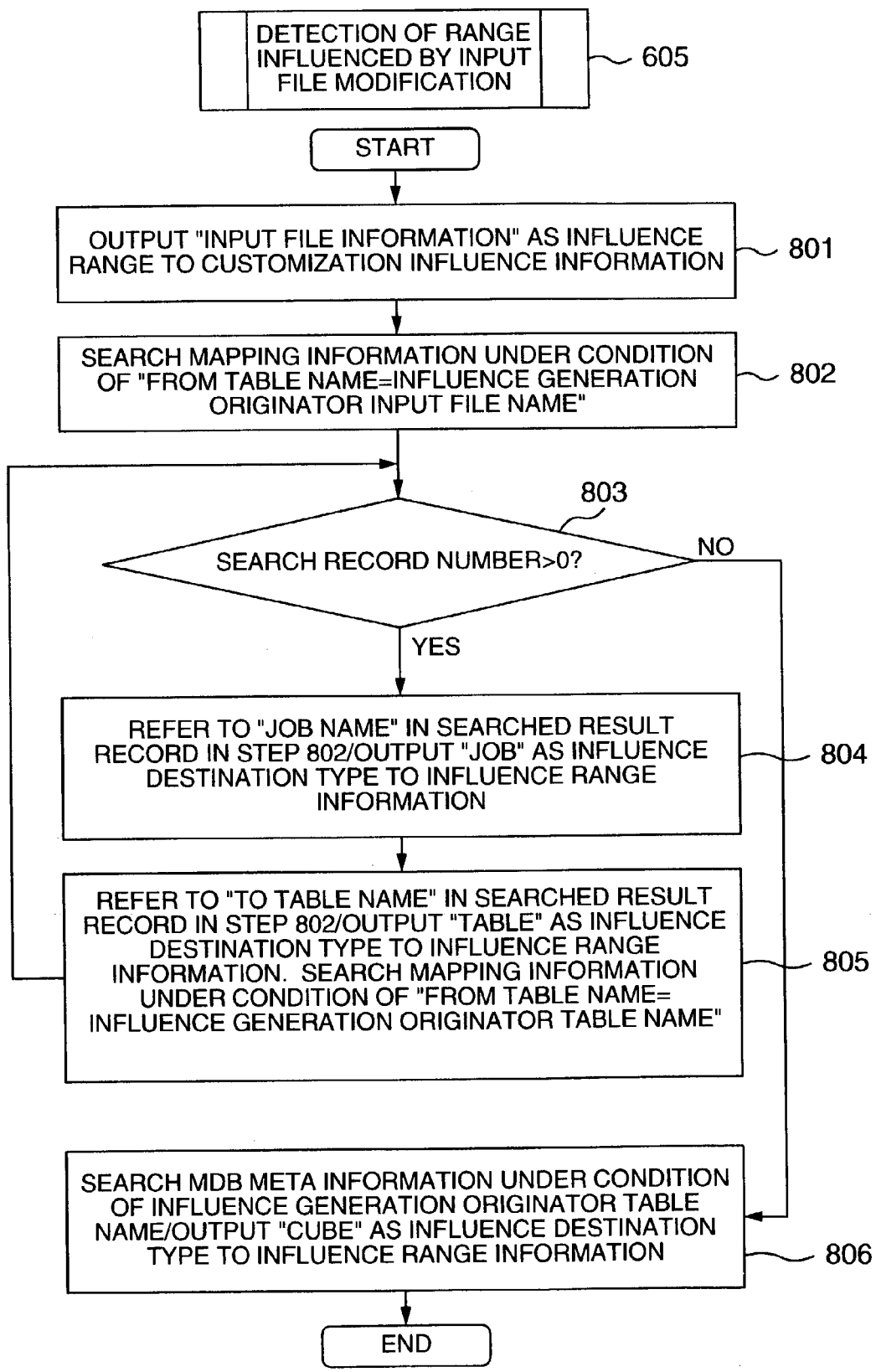
FIG. 8 is a flowchart of operations of detecting an influence range of an input file alteration.

Explanation will then be made as to the "influence range detection 605 for input file modification" with use of FIG. 8. The operations to be carried out in the influence range detection 605 correspond to operations of listing the related table name, job name and cube name according to the arrow direction from the input file side in FIG. 2. When performing repetitive searching operation over the meta information 130 of data warehouse (DWH) schema shown in FIG. 4 to detect an influence range.

At a step 801, since a modification took place in the input file itself, the system outputs information for setting an influence range in the influence range information 140 in FIG. 1. The system outputs the "input file" as a value to the item "influence destination type" of the influence range information 140. In the modification pattern designation 111, the system stores the input file name entered by the user in the resource name. Next, the system searches the modification pattern information narrowed down based on the selected pattern name under a search condition that the item "influence destination type" includes the value of the "input file". The system stores a correspondence relation between the variable name and value obtained as a result of the search as modification reference contents.

At a step 802, the system searches the item mapping 422 in FIG. 4 under a condition of "From table name=input file name".

At a step 803, the system judges whether or not the number of records as the searched result of the step 802 is zero. When the record number of the searched result is not larger than zero, the system performs the operation of a step 806. When the record number of the searched result is not smaller than 1, the system performs the operation of a step 804.

At the step 804, the system refers to "job name" in the record of the searched result obtained in the step 802, and outputs the influence range information 140 under the job name shown therein. The value of the "job" is stored in the "influence destination type" of the influence range information 140, and the value stored in the "job name" in the record of the searched result obtained in the step 802 is stored in the "resource name". A modification object item name of the input table side of the corresponding job and a modification object item name of the output table side influenced by the modification object item of the input table side are stored in the "modification object contents" of the influence range information 140. When a correspondence is not present between the From item name and To item name, the system adds a new correspondence between the From item name and To item name to the "modification object contents" of the influence range information 140.

At a step 805, the system refers to the "From table name" in the record of the searched result obtained in the step 802, and identifies a table name to be influenced by the modification. The system outputs the influence range information 140 indicative of the influence generation to the schema of the identified table. The value of the "table" is stored in "influence destination type" of the influence range information 140, and the value stored in the "From table name" in the record of the searched result obtained in the step 802 is stored in the "resource name". Addition or modification contents to the From item added or modified in the step 704 is stored in the "modification object contents" of the influence range information 140. And the system refers to the "To table name" in the record of the searched result obtained in the step 802, and searches the item mapping 422 of FIG. 4 under a search condition of "influence generation originator table name=the value stored in the To table". The system then proceeds to the step 803.

At a step 806, the system generates influence range information to the cube. The system searches the cube 411 of FIG. 4 under a search condition of "load table name=influence generation originator table name". The system refers to the "cube name" in the record of the searched result to obtain a cube name to be influenced thereby. The value of the "cube" is stored in the "influence destination type" of the influence range information 140, and the cube name is stored in the "resource name". Addition or modification contents to the To item added or modified in the step 804 is stored in the "modification object contents" of the influence range information 140.

Through the aforementioned operations, the system can trace backwardly arrows in the data processing operation of FIG. 2, and can generate the influence range information 140 on the basis of the resource names (job name, table name and cube name) obtained by backwardly tracing the arrows.

Explanation will next be made as to the influence range detecting step 606 for reference information modification in FIG. 6. In this operation, the system searches for a record satisfying that the influence destination type of the modification pattern information 120 is at-runtime reference information, and modifies the at-runtime reference information 730 shown in FIG. 5 with use of a resource name of the record of the searched result and a variable name and its values. As the at-runtime reference information 730, for example, there is a calendar table 531 to be referred to to know a business due date or the like on the job execution date. FIG. 5 shows the calendar table 531. In the case of the modification pattern information 120 shown in FIG. 1, the values of the "at-runtime reference information" and "calendar master" are stored in the modification destination type and resource name respectively. On the basis of the stored values of the modification pattern information 120, the system determines that modification is to be carried out to each month and each year to the calendar table 531. On the basis of the determination the system modifies the calendar table 531 in the at-runtime reference information 730.

Through the above operations, the system generates the influence range information 140. Next the system generates the DWH construction information 150 based on the influence range information 140 in the DWH construction information modification 113. Explanation will be made as to the DWH construction information modification 113 by referring to FIG. 1.

In the schema definition information modification 118 in FIG. 1, the system modifies the schema definition information 710 in FIGS. 1 and 5.

The system first reflects a modification of the dimension or dimension layer on the schema definition information 710 associated with the MDB as a modification associated with the cube. On the basis of the resource name of the record having the influence destination type of the influence range information 140 being the cube and the modification object contents, the system modifies the meta information 410 of multi database (MDB) schema, and generates the mapping definition information 512, cube definition information 513, dimension mapping file 514 and layer definition 515 in FIG. 5 from the meta information 410 of multi database (MDB) schema.

Then the system reflects modification of the table item and index on the table definition information 511 of FIG. 5 as modification associated with the table. On the basis of the resource name having the influence destination type of the influence range information 140 being the table and modification object contents, the system modifies the group of pieces of meta information 430 of relational database (RDB) schema, and generates the table definition information 511 shown in FIG. 5 from the group of pieces of meta information 430 of relational database (RDB) schema.

In the data transformation control information modification 119 in FIG. 1, the system reflects a modification of the item mapping 422 in the job on the command group 522 in FIG. 5. On the basis of the resource name of the record having the influence destination type of the influence range information 140 being the job and modification object contents, the system modifies the item mapping 422 of the job, and generates the command group 522 in FIG. 5 from the modified item mapping 422.

In the at-runtime reference information modification 121 in FIG. 1, the system modifies the at-runtime reference information 730 in FIGS. 1 and 5. On the basis of the resource name of the record having the influence destination type of the influence range information 140 being the at-runtime reference information and modification object contents, the system modifies the value of the table held in the at-runtime reference information 730 of FIG. 5.

The system can also store a program for implementing the database construction modifying method of the present invention in a portable storage medium, read it in a main storage for its execution.

In accordance with the present invention, the data warehouse system operated on a plurality of middleware bases can be modified on the basis of pre-registered modification pattern information. As a result, the process of the data warehouse system can be modified by the user who instructs the data warehouse system to be modified, while the user can eliminate the need for know detailed internal information and internal system structure about, e.g., the fact that the influence range of the internal process of the system is to be detected as a search condition of which component in the system or that modification is to be applied to which resource. Therefore, the developer can eliminate the need for searching for a modification location or performing modifying operations while understanding the structure of each middleware base.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer-implemented method for modifying database construction information for a database system having a plurality of databases and meta information including database metadata relating to schema definition of the database, wherein the database construction is modified by changing the schema definition, comprising the steps of:

providing job metadata including item mapping for defining correspondence relation between databases and jobs for defining data transformation between databases in said meta information;

holding modification pattern information comprising a plurality of modification patterns wherein a modification to a system is designated by a variable and said modification pattern information further comprising management information for identifying a location to be influenced by said variable;

prompting a user to select a variable to designate relevant modification from a plurality of modification patterns;

detecting modification influence ranges of said schema definition and said data transformation between the databases on the basis of said meta information in accordance with the selected variable, and performing modification range detecting operation to output the influence range of said meta information as influence range information; and executing system construction information modifying operation to generate system construction information for setting and execution of a middleware by modifying the schema definition held in said meta information, the data transformation and at-runtime reference information.

2. The method as set forth in claim 1, wherein said modification pattern information has information which manages distinctively whether a variable name having a value to be entered by a user and the value entered for said variable name are used as search condition values in said modification range detecting operation or as modification values in said system construction information modifying operation, and controls the variable values entered in said modification range detecting operation and in said system construction information modifying operation on the basis of the distinction.

3. The method as set forth in claim 1, wherein, in said modification range detecting operation, job modification detecting operation of detecting a modification in a job influenced by a schema modification of a database during operation of a system, database modification detecting operation of detecting a modification in the database influenced by a job modification during the operation of the system, and operation of alternately inputting and outputting detected results of said job modification detecting operation and said database modification detecting operation are repetitively carried out to output a modification object in the entire systems said influence range information.

4. The method as set forth in claim 1, wherein, in said modification range detecting operation, a system division corresponding to a constituent element of the system is output as said influence range information.

5. The method as set forth in claim 4, wherein the constituent element of said system is at least one of a multidimensional database, a relational database, an input file to be input to the system, job operation of performing data transformation on the database, and at-runtime reference information to be referred to in said job operation.

6. The method as set forth in claim 1, wherein, in said system construction information modifying operation, said system constituent element is modified on the basis of the system division corresponding to the system constituent element stored in said influence range information.

7. The method as set forth in claim 6, wherein the constituent element of said system is at least one of a multidimensional database, a relational database, an input file to be input to the system, job operation of performing data transformation on the database, and at-runtime reference information to be referred to in said job operation.

8. A computer-readable storage medium which stores a program for implementing a method for modifying database construction information for a database system having a plurality of databases and meta information including database metadata relating to schema definition of the database, wherein the database construction is modified by changing the schema definition, said method comprising the steps of:

providing job metadata including item mapping for defining correspondence relation between databases and jobs for defining data transformation between databases in said meta information;

holding modification pattern information comprising a plurality of modification patterns wherein a modification to a system is designated by a variable and said modification pattern information further comprising management information for identifying a location to be influenced by said variable;

prompting a user to select a variable to designate relevant modification from a plurality of modification patterns;

detecting modification influence ranges of said schema definition and the data transformation between the databases on the basis of said meta information in accordance with the selected variable and performing modification range detecting operation to output the influence range to said meta information as influence range information; and executing system construction information modifying operation to generate system construction information to set and execute middleware by modifying the schema definition, data transformation and at-runtime reference information stored in said meta information on the basis of said influence range information and said meta information.

9. A computer system for modifying database construction information for a database system having a plurality of databases and meta information including database metadata relating to schema definition of the database, wherein the database construction is modified by changing the schema definition, the computer system comprising:

means for providing job metadata including item mapping for defining correspondence relation between databases, and jobs for defining data transformation between databases;

means for holding modification pattern information comprising a plurality of modification patterns in storage device wherein a modification to a system is designated by a variable and said modification pattern information further comprising management information for identifying a location to be influenced by said variable;

means for prompting a user to select a variable to designating relevant modification from a plurality of modification patterns on a display screen;

means for means for detecting modification influence ranges of said schema definition and the data transformation between the databases on the basis of said meta information in accordance with the selected variable and performing modification range detecting operation to output the detected influence range to said meta information as influence range information; and means for executing system construction information modifying operation to generate system construction information to set and execute middleware by modifying the schema definition, data transformation and at-runtime reference information stored in said meta information on the basis of said influence range information and said meta information.

* * * * *